(No Model.)
W. J. BREWER.
BEARING FOR CAR AXLES.
No. 439,341. Patented Oct. 28, 1890.
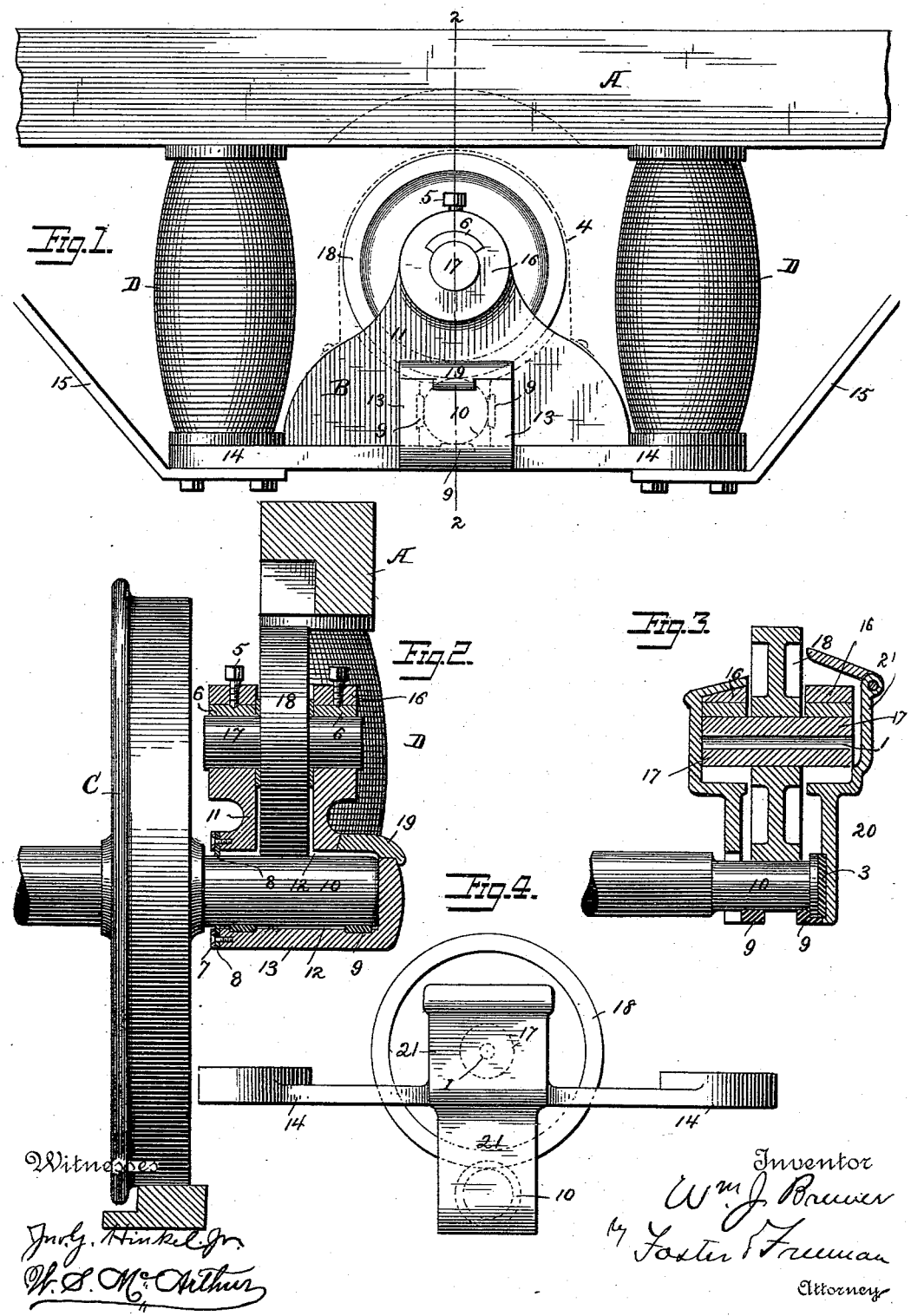

UNITED STATES PATENT OFFICE.

WILLIAM JOHN BREWER, OF LONDON, ENGLAND.

BEARING FOR CAR-AXLES.

SPECIFICATION forming part of Letters Patent No. 439,341, dated October 28, 1890.

Application filed April 9, 1888. Serial No. 270,024. (No model.)

*To all whom it may concern:*

Be it known that I, WILLIAM JOHN BREWER, of London, England, a subject of the Queen of Great Britain, temporarily residing in Brooklyn, Kings county, New York, have invented certain new and useful Improvements in Bearings for Car-Axles, of which the following is a specification.

This invention relates to bearings for the journals of car-axles and the like; and it consists in the novel structure hereinafter fully set forth.

In the accompanying drawings, the improved bearing is illustrated in connection with an axle and wheel of a street-car, of which—

Figure 1 is a side elevation; Fig. 2, a vertical sectional elevation of the bearing, taken on the line 2 2 of Fig. 1. Fig. 3 is a sectional elevation of a modified form of the bearing, and Fig. 4 is a front elevation thereof.

Many devices for reducing the friction upon the journal of car-axles have been employed with more or less success. The present improvement is directed to the simplification of such devices, whereby the substitution thereof for the ordinary bearing may be effected readily and with little or no great expense.

Referring to the drawings, A represents the platform or lower portion of a car of any of the well-known descriptions—such as a street-railway car—provided with an axle-bearing B, in which the journal 10 of a wheel C revolves. The bearing B consists of a suitably-shaped box 13, open at its inner sides and providing a recess 12, in which the journal 10 lies, its end abutting against the front wall of the box. The bearing, as shown, is formed with horizontally-extending flanges 14, providing seats for the ends of springs D, that are interposed between the under side of the longitudinal sill-plate of the car and the bearing, and the latter is shown connected to the car by means of brace-rods 15, although other means may be employed, if desired.

Above the journal 10, I mount an anti-friction wheel 18, that is adapted to afford a bearing for said journal, and through which the weight of the car is transmitted to the journal. As shown, this wheel is mounted upon a shaft 17, held in bearings 16, provided in a pair of flanges 11, rising from and formed integral with the bearing B. The upper portion of the box 13 is removed, so that the lower portion of the wheel 18 may extend into its recess a sufficient distance to form a proper bearing for the journal.

The opposite vertical sides and the lower side of the box 13 may be provided with bearing-plates 9 for the journal to prevent any undue lateral and vertical motion between the box and the journal. The inner side of the box may be fitted with leather or rubber washers 8, surrounding the axle, and held in place and to the side of the box by rings 7, so as to prevent the leakage of lubricant from the box and the passage of dirt thereto.

The upper side of the bearing 16 may be provided with a removable brass or bearing block 6, that may be replaced when worn, or be set down upon the shaft 17 by means of a set-screw 5, and thus hold the wheel 18 in contact with the journal of the car-axle.

The upper side of the box 13 may be provided with an opening closed by a movable cover 19, through which lubricant may be supplied to the journal; but very small quantities thereof will be needed.

The improvement provides the axle-box and anti-friction bearing in a single structure and adapted for use as a substitute for any of the ordinary axle-boxes without any alteration in the ordinary supporting-gear.

In practice I propose to provide the box and the anti-friction wheel with a cover 4, as indicated by dotted lines, Fig. 1, so as to exclude as much of the dirt therefrom as possible.

In some instances the bearing B may have a grease-box 21, provided around the bearing 16 of the anti-friction wheel 18, as shown in Figs. 3 and 4, and when said wheel and its shaft 17 are fixed so as to revolve together the latter may be provided with an oil-channel 1, through which the oil may be supplied from one side of the grease-box to the other. The journal 10 of the main axle also, as shown, may be simply guided in flanges 20, depending from the grease-box, having under bearings 9 to keep it in contact with the anti-friction wheel and prevent it from accidental displacement, and the horizontal flanges 14 for supporting the springs D and affording means for connecting the bearing with the vehicle may also extend in the manner shown. That portion of the bearing contacting with the end of the journal 10 may be provided with a bearing-piece 3, of metal or wood, taking the lateral thrust of the journal, and which may be replaced when worn.

It is to be understood that I do not limit myself to the use of this improved bearing with car-axles, as it is obvious that its use is not necessarily confined thereto, but may be employed in many other forms of bearings with other vehicles and with shafts instead of axles.

What I claim is—

The combination, with an axle-box having a recess for the main axle and two flanges extending upward and provided with adjustable bearing, of an anti-friction wheel between said flanges mounted in said adjustable bearing, substantially as described.

In testimony whereof I have signed my name to this specification in the presence of two subscribing witnesses.

WILLIAM JOHN BREWER.

Witnesses:
W. M. McDOUGALL,
HENRY T. BUELL.